United States Patent [19]

Tamura et al.

[11] 4,167,551

[45] Sep. 11, 1979

[54] PROCESS FOR THE PRODUCTION OF AN ION EXCHANGE MEMBRANE

[75] Inventors: Noriyoshi Tamura; Kunio Kihara, both of Ami, Japan

[73] Assignee: Mitsubishi Petrochemical Company Limited, Tokyo, Japan

[21] Appl. No.: 816,199

[22] Filed: Jul. 15, 1977

Related U.S. Application Data

[63] Continuation of Ser. No. 620,852, Oct. 8, 1975, abandoned.

[30] Foreign Application Priority Data

Oct. 21, 1974 [JP] Japan .............................. 49-120330
Feb. 25, 1975 [JP] Japan .............................. 50-22460

[51] Int. Cl.$^2$ ............................................. C08J 5/22
[52] U.S. Cl. .................................. 521/27; 264/122; 264/126; 264/340
[58] Field of Search ............... 264/122, 126, 232, 340; 260/2.1 R, 2.1 E, 897 B, 897 A, 836, 837 R

[56] References Cited

U.S. PATENT DOCUMENTS

| | | | |
|---|---|---|---|
| 3,133,889 | 5/1964 | Hazenberg et al. | 260/2.1 E |
| 3,276,991 | 10/1966 | Hani et al. | 260/2.1 R |
| 3,453,354 | 7/1969 | Tejeda et al. | 264/122 |
| 3,509,078 | 4/1970 | Roubinek et al. | 260/2.1 E |
| 3,876,565 | 4/1975 | Takashima et al. | 260/2.1 E |

*Primary Examiner*—Jeffery R. Thurlow
*Attorney, Agent, or Firm*—Wenderoth, Lind & Ponack

[57] ABSTRACT

This invention relates to a process for the production of a heterogeneous ion exchange membrane having a high ion transport number in the presence of a high ion concentration, which comprises mixing a finely powdered ion exchange material with a crystalline polyolefin resin, forming the resultant mixture into a membrane-shaped article and treating the membrane-shaped article with an aqueous solution of at least one salt selected from alkali metal salts and ammonium salts, having a concentration of from 17% by weight to saturation, at a temperature of at least 80° C. for at least 10 minutes.

11 Claims, No Drawings

PROCESS FOR THE PRODUCTION OF AN ION EXCHANGE MEMBRANE

This is a continuation of application Ser. No. 620,852, filed Oct. 8, 1975, now abandoned.

BACKGROUND OF THE INVENTION

This invention relates to a process for the production of an ion exchange membrane and more particularly, it is concerned with an improved process for producing a heterogeneous ion exchange membrane having a high ion transport number in a high ion concentration.

An ion exchange membrane which comprises a particulate ion exchange resin attached to a support of synthetic fiber screen has been put to practical use. Such an ion exchange membrane supported with synthetic fiber is superior in mechanical strength to a homogeneous ion exchange membrane which consists of a membrane of ion exchange resin itself, but the mechanical strength of the ion exchange membrane is not sufficient, so that there are various limitations in its practical uses. For example, in order to improve the practicability of the ion exchange membrane by strengthening the chemical structure thereof it is necessary to increase the degree of cross-linking in the structure thereby to reduce the swellability of the membrane, which in turn reduces the concentration of the ion exchanging group, resulting in an increase of the specific resistance of the membrane, although the ion transport number is increased. Furthermore, the ion exchange membranes now on the market swell when they are dipped in aqueous solutions and shrink when they are dried, whereby the membranes become deformed and cracked and cannot be put to practical use. Accordingly, it is absolutely necessary to use the membranes in a wet state and at room temperature, which necessity is a bar to practical use thereof in an ion exchange apparatus.

Since such an ion exchange membrane generally lacks flexibility, there are some difficulties when using this ion exchange membrane in an ion exchange apparatus, and other possible uses of the ion exchange membrane in which the ion exchangeability is utilized are also precluded.

For the purpose of preparing a novel heterogeneous ion exchange membrane whereby the above described disadvantages can be overcome, it has hitherto been proposed to mix a finely powdered ion exchange material with a polyolefin resin as a matrix, mold the mixture and subject the molded article to post-treatment using hot water, as disclosed in Japanese Patent Publication No. 24262/1972 (corresponding to U.S. Pat. No. 3,627,703), Japanese Patent Public Disclosure No. 43888 (corresponding to U.S. Pat. No. 3,876,565) and Japanese Patent Application No. 53189/1974, published under Disclosure No. 145379/1975. The heterogeneous ion exchange membranes prepared by these processes can practically be used with some advantages as an ion exchange membrane for the desalting treatment of an aqueous solution having a relatively low ion concentration, but are not so satisfactory, for use as an ion exchange membrane for the desalting treatment of an aqueous solution having a relatively high concentration. That is to say, the heterogeneous ion exchange membrane prepared by the above described process shows an adequately low specific resistance, but, at the same time, has a disadvantage that the ion transport number is greatly lowered.

SUMMARY OF THE INVENTION

It is an object of the invention to provide an improved process for the production of a heterogeneous ion exchange membrane.

It is another object of the invention to provide a process for the production of a heterogeneous ion exchange membrane, i.e., cation exchange membrane, or anion exchange membrane having excellent electrochemical properties in an aqueous solution having a high ion concentration without deteriorating the flexibility and mechanical strength of the membrane.

It is a further object of the invention to provide a heterogeneous ion exchange membrane having an ion transport number and specific resistance which are balanced.

These objects can be accomplished by a process for the production of a heterogeneous ion exchange membrane having a high ion transport number in a high ion concentration, which comprises mixing a finely powdered ion exchange material with a crystalline polyolefin resin, forming the resultant mixture into a membrane and treating the membrane with an aqueous solution of an alkali metal salt or ammonium salt having a concentration of 5% by weight or more at 80° C. or higher.

DETAILED DESCRIPTION OF THE INVENTION

We, the inventors, have made basic studies on a heterogeneous ion exchange membrane and, in particular, with respect to a synthetic resin as a matrix and an ion exchange resin as a primary constituent for ion exchange dialysis, and found that the properties of a heterogeneous ion exchange membrane are greatly changed by a post-treatment. Then we have examined various post-treatments in detail so as to improve a heterogeneous ion exchange membrane and reached the present invention.

A heterogeneous ion exchange membrane prepared by the prior art method contains an excessive quantity of water at the boundary between a non-crystalline, hydrophilic ion exchange resin and a highly crystalline, hydrophobic synthetic resin matrix. The excess water in the membrane lowers the specific resistance of the membrane, but, on the other hand, is considered to cause a large decrease of ion transport number in a high ion concentration. Further, if the content of water in the membrane is excessively decreased, the specific resistance of the membrane is increased too largely to be practically used. Therefore, it is considered necessary, in order to maintain excellent properties of the membrane in a high ion concentration, to suppress the content of water in a heterogeneous ion exchange membrane to minimum within a range which permits a well balanced specific resistance.

Utilizing the fact that, in an aqueous solution having a high ion concentration, the water content of an ion exchange resin is decreased and, at the same time, the degree of swelling thereof is also decreased, we have found that if a finely powdered ion exchange resin is mixed with a crystalline polyolefin resin, the resultant mixture is formed into a membrane and the membrane is treated with an aqueous solution of an alkali metal salt or ammonium salt, having a concentration of 5% or more, at 80° C. or higher, the content of water in the heterogeneous ion exchange membrane, that is to say, the content of water contained in the ion exchange resin and the interfacial layer between the ion exchange resin and synthetic resin matrix, in the step of the post-treatment, can be controlled within a necessary and minimum range. The present invention is based on this discovery.

In the heterogeneous ion exchange membrane produced by the process of the present invention, the disadvantage of a heterogeneous ion exchange membrane produced by the prior art process, namely that the ion transport number is lowered in a high ion concentration, can substantially be overcome, and the specific resistance of the membrane can be held sufficiently low without deteriorating the flexibility and mechanical strength of the membrane. Therefore, the heterogeneous ion exchange membrane produced by the process of the invention can be sufficiently used for desalting treatment of an aqueous solution having a high salt concentration, which desalting treatment has been considered impossible when using the heterogeneous ion exchange membrane of the prior art.

The present invention will now be illustrated as to materials used:

(I) Polyolefin resins used as a matrix

Crystalline resins comprising predominantly olefin components are used, for example, olefin homopolymers such as polyethylene, polypropylene and polybutene, olefin-containing copolymers such as ethylene-propylene copolymer and ethylene-vinyl acetate copolymer and mixtures thereof.

(II) Ion exchange resins (A) Finely powdered cation exchange resins (1) An aromatic compound having a vinyl group and being capable of accepting readily a cation exchange group, and a compound having in the molecule two or more unsaturated bonds polymerizable therewith, are subjected to suspension copolymerization in an aqueous medium and the resulting bead-shaped copolymer is treated with a sulfonating agent, followed by mechanical treatment to produce a fine powder.

(2) An aromatic compound having vinyl group and being capable of accepting readily a cation exchange group, and a compound having in the molecule two or more unsaturated bonds polymerizable therewith, are subjected to emulsion copolymerization in an aqueous medium and the resulting finely powdered copolymer is treated with a sulfonating agent.

(3) A cation exchange resin consisting essentially of a phenol compound/formaldehyde cocondensate is finely powdered mechanically.

Examples of the aromatic compound having a vinyl group and being capable of accepting readily a cation exchange group, which can be used herein, are styrene, vinyltoluene, ethylvinylbenzene, α-methylstyrene, vinylnaphthalene and derivatives thereof. These compounds can be used individually or in combination.

As the compound having in the molecule two or more polymerizable unsaturated bonds there is generally used divinylbenzene.

(B) Finely powdered anion exchange resins (1) An epoxy compound and an amine compound are reacted and hardened and the resulting hardened epoxy-amine condensate is finely powdered mechanically.

Examples of the epoxy compound used herein are as follows:

(a) Epihalohydrin compounds: epichlorohydrin, α-methylepichlorohydrin, etc.

(b) Compounds having two or more glycidyl ether groups in the molecule: epoxy compounds of bisphenol A type represented by the following formula,

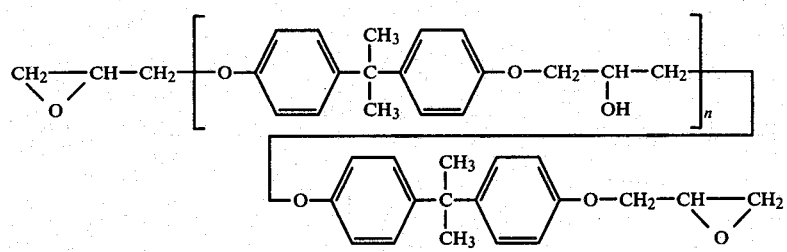

and epoxy compounds of novolak type represented by the following formula,

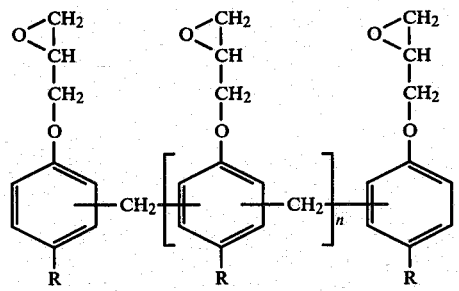

in which R represents hydrogen or an alkyl group such as methyl.

(c) Compounds having two or more glycidyl ester groups in the molecule: compounds such as represented by the following formula,

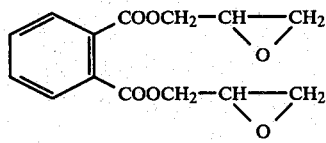

(d) Compounds having glycidylamino group represented by the following general formula,

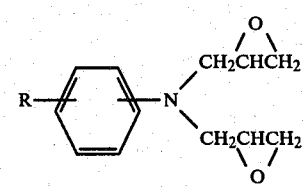

in which R represents an alkyl group.

(e) Compounds having two or more oxyran rings: compounds such as represented by the following formulas,

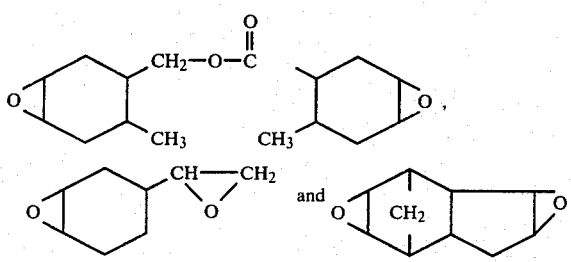

The amine compound used herein is, for example, a compound represented by the general formula, NR₃ in which R represents a hydrogen atom, alkyl group or group of $+CH_2-CH_2NH)_{\overline{n}}H$.

(2) An aromatic compound having vinyl group and being capable of accepting readily an anion exchange group, and a compound having in the molecule two or more unsaturated bonds polymerizable therewith, are subjected to suspension copolymerization in an aqueous medium and the resulting bead-shaped copolymer is then subjected to chloromethylation and amination, followed by finely powdering mechanically.

Examples of the aromatic compound having a vinyl group and being capable of accepting readily an anion exchange group, which can be used herein, are styrene, vinyltoluene, ethylvinylbenzene, α-methylstyrene, vinylnaphthalene and derivatives thereof. These compounds can be used individually or in combination.

As the compound having two or more polymerizable unsaturated bonds in the molecule there is generally used divinylbenzene.

(3) An anion exchange resin consisting essentially of a phenol compound/formaldehyde condensate is finely powdered mechanically.

The mixing ratio of a polyolefin resin (I) and finely powdered cation or anion exchange resin (II) is ordinarily 2:8 to 8:2 by weight, preferably, 4:6 to 7:3 by weight. If the mixing ratio of a polyolefin resin (I) is less than 20% by weight, the mechanical strength of the formed ion exchange membrane is lowered and the membrane cannot be put to practical use, while if more than 80% by weight, the specific resistance of the formed ion exchange membrane is increased to an undesirable extent. The composition of these components may be determined depending on the intended use.

Mixing of a polyolefin resin (I) and finely powdered cation or anion exchange resin (II) can be carried out by any method capable of achieving a uniform mixture, for example, by means of an extruder or rolls. The mixing is preferably carried out at a temperature of higher than the melting point of the polyolefin resin. Other additives such as antioxidants, colorants, fillers, lubricants, etc. can be added at this mixing step or other step.

The mixture obtained in this way is then formed into, for example, a film of 0.1 to 3 mm, in general, 0.2 to 1 mm, or a sheet, under suitable conditions using rolls, extruders or presses. The above described mixing or blending step can be used as a substitute for the plasticizing step which is to be effected before the forming operation.

The membrane-shaped article produced in this way is further subjected to post-treatment as described hereinafter to obtain the ion exchange membrane of the invention. The post-treatment is carried out by immersing this membrane-shaped article in an aqueous solution of an alkali metal salt or ammonium salt having a predetermined concentration at 80° C. for a suitable period of time. When using metal salts other than these salts, the other metals, in particular, transition metals, combine with the ion exchange resins to form chelate compounds and, consequently, are hard to remove through dissociation.

Useful examples of the alkali metal salt are alkali metal halides such as lithium chloride, sodium chloride, potassium chloride, rubidium chloride, cesium chloride, lithium bromide, sodium bromide, potassium bromide, rubidium bromide, cesium bromide, lithium iodide, sodium iodide, potassium iodide, rubidium iodide and cesium iodide, alkali metal sulfates such as lithium sulfate, sodium sulfate, potassium sulfate, rubidium sulfate and cesium sulfate, alkali metal nitrates such as lithium nitrate, sodium nitrate, potassium nitrate, rubidium nitrate, and cesium nitrate, alkali metal phosphates such as lithium phosphate, sodium phosphate, potassium phosphate, rubidium phosphate, cesium phosphate, and alkali metal acetates such as lithium acetate, sodium acetate, potassium acetate, rubidium acetate and cesium acetate.

Useful examples of the ammonium salt are ammonium chloride, ammonium sulfate, ammonium nitrate, ammonium phosphate and ammonium acetate. Ammonium hydroxide can also be used.

The concentration of alkali metal salt, ammonium salt or ammonium hydroxide is ordinarily 5% by weight to saturation, preferably, 10% by weight to saturation. When the concentration is increased, the transport number is increased, but the specific resistance tends to be increased. Therefore, a suitable concentration should be chosen depending on the intended use within a range of 5% by weight or more, since if less than 5%, the transport number becomes too small.

The period of time necessary for the immersion of the membrane-shaped article is generally 10 minutes or more, preferably, 20 minutes to several hours.

The so prepared and post-treated heterogeneous ion exchange membranes, that is, cation or anion exchange membranes, can exhibit excellent electrochemical properties, in particular, well-balanced ion transport number and specific resistance in a high ion concentration aqueous solution, without deteriorating the flexibility and mechanical strength of the membrane.

The present invention will be further illustrated in greater detail in the following examples and comparative examples. It will be self-evident to those skilled in the art that the ratios, ingredients in the formulations and the order of operations can be modified within the scope of the present invention. Therefore, the present invention is not to be interpreted as being limited to the following examples. All parts, percents and the like are to be taken as those by weight, unless otherwise indicated.

EXAMPLE 1

8 parts of divinylbenzene was added to 92 parts of styrene monomer, subjected to suspension copolymerization using benzoyl peroxide as a catalyst to obtain a granular copolymer and then sulfonated with oleum, thus obtaining a strongly acidic cation exchange resin((A); ion exchange capacity=4.5 meq/g). The resin (A) was finely pulverized to a grain size of 325 mesh or more (Tyler) by means of a vibrating mill. To 60 parts of this fine powder cation exchange resin was added 40 parts of polypropylene, blended by rolls and pressed to form a membrane (B).

The resulting membrane-shaped article was immersed in a saturated aqueous solution of sodium chloride at 100° C. for 30 minutes to obtain a heterogeneous cation exchange membrane having a thickness of 0.7 mm, ion transport number of 0.92 and specific resistance of 115 Ω·cm.

COMPARATIVE EXAMPLE 1

The membrane-shaped article (B) obtained in an analogous manner to Example 1 was immersed in hot water at 100° C. for 30 minutes to obtain a heterogeneous cation exchange membrane having a thickness of 0.7 mm, ion transport number of 0.80 and specific resistance of 84 Ω·cm. 125EXAMPLE 2

The membrane-shaped article (B) obtained in an analogous manner to Example 1 was immersed in a saturated aqueous solution of sodium chloride at 100° C. for 1 hour to obtain a heterogeneous cation exchange membrane having a thickness of 0.6 mm, ion transport number of 0.92 and specific resistance of 125Ω·cm.

COMPARATIVE EXAMPLE 2

The membrane-shaped article (B) obtained in an analogous manner to Example 1 was immersed in hot water at 100° C. for 1 hour to obtain a heterogeneous cation exchange membrane having a thickness of 0.7 mm, ion transport number of 0.77 and specific resistance of 85 Ω·cm.

EXAMPLE 3

The strongly acidic cation exchange resin (A) obtained in an analogous manner to Example 1 was pulverized to a grain size of 150 mesh or more by means of a vibrating mill. 60 parts of the resulting powdered cation exchange resin was mixed with 40 parts of polypropylene, blended by rolls and formed into a sheet. The membrane-shaped article obtained in this way was immersed in a saturated aqueous solution of sodium chloride at 100° C. for 60 minutes to obtain a heterogeneous cation exchange membrane having a thickness of 0.4 mm, ion transport number of 0.89 and specific resistance of 270Ω·cm.

COMPARATIVE EXAMPLE 3

The membrane-shaped article obtained in an analogous manner to Example 3 was immersed in hot water at 100° C. for 1 hour to obtain a heterogeneous cation exchange membrane having a thickness of 0.4 mm, ion transport number of 0.70 and specific resistance of 250Ω·cm.

EXAMPLES 4 TO 7 AND COMPARATIVE EXAMPLE 4

The membrane-shaped articles obtained in an analogous manner to Example 1 were immersed in saturated aqueous solutions of sodium chloride at temperatures as shown in Table 1 for 30 minutes. The thickness, ion transport number and specific resistance of the resulting cation exchange membranes (along with that of Example 1) are shown in Table 1.

Table 1

|  | Ex. 4 | Ex. 5 | Ex. 6 | Ex. 1 | Ex. 7 |
| --- | --- | --- | --- | --- | --- |
| Treating Temperature (°C.) | 80 | 90 | 95 | 100 | 105 |

Table 1-continued

|  | Ex. 4 | Ex. 5 | Ex. 6 | Ex. 1 | Ex. 7 |
| --- | --- | --- | --- | --- | --- |
| Thickness (mm) | 0.75 | 0.7 | 0.65 | 0.7 | 0.65 |
| Ion Transport Number | 0.93 | 0.92 | 0.93 | 0.92 | 0.93 |
| Specific Resistance (Ω·cm) | 255 | 230 | 196 | 115 | 130 |

| Comparative Ex. 4 |
| --- |
| 70 |
| 0.75 |
| 0.94 |
| 300 |

EXAMPLES 8 TO 10 AND COMPARATIVE EXAMPLE 5

The membrane-shaped articles obtained in an analogous manner to Example 1 were immersed in aqueous solutions having concentrations as shown in Table 2 at 100° C. for 30 minutes. The thickness, ion transport number and specific resistance of the resulting heterogeneous cation exchange membranes are shown in Table 2.

Table 2

|  | Ex. 8 | Ex. 9 | Ex. 10 | Ex. 1 | Comparative Ex. 5 |
| --- | --- | --- | --- | --- | --- |
| Concentration of Aqueous Sodium Chloride Solution (% by weight) | 5 | 9 | 17 | 29 (Saturated) | 2 |
| Thickness (mm) | 0.7 | 0.65 | 0.7 | 0.7 | 0.7 |
| Ion Transport Number | 0.84 | 0.86 | 0.92 | 0.92 | 0.81 |
| Specific Resistance (Ω·cm) | 108 | 119 | 125 | 115 | 90 |

EXAMPLES 11 TO 15 AND COMPARATIVE EXAMPLES 6 TO 7

The membrane-shaped articles obtained in an analogous manner to Example 1 were immersed in 23% aqueous solutions of alkali metal compounds as shown in Table 3 at 100° C. for 30 minutes. The thickness, ion transport number and specific resistance of the resulting heterogeneous cation exchange membranes are shown in Table 3.

Table 3

|  | Alkali Metal Compound | Thickness (mm) | Ion Transport Number | Specific Resistance (Ω·cm) |
| --- | --- | --- | --- | --- |
| Ex. 11 | Sodium Carbonate | 0.7 | 0.89 | 99 |
| Ex. 12 | Sodium Sulfate | 0.7 | 0.88 | 123 |
| Ex. 13 | Sodium Acetate | 0.7 | 0.88 | 115 |
| Ex. 14 | Potassium Chloride | 0.7 | 0.89 | 110 |
| Ex. 15 | Ammonium Sulfate | 0.7 | 0.90 | 118 |
| Comparative Ex. 6 | Copper Sulfate | 0.7 | 0.95 | 400 |
| Comparative Ex. 7 | Calcium chloride | 0.7 | 0.93 | 550 |

EXAMPLE 16

92 parts of styrene monomer was mixed with 8 parts of divinylbenzene, subjected to emulsion copolymerization using potassium persulfate as a catalyst to obtain a fine powder copolymer and then sulfonated with oleum, thus obtaining as a fine powder a strongly acidic cation exchange resin with an ion exchange capacity of 5.2 meq/g.

60 parts of the resulting finely powdered cation exchange resin was mixed with 40 parts of polypropylene, blended by means of rolls and press-formed into a membrane article. The resulting membrane-shaped article was immersed in a saturated aqueous solution of sodium chloride at 100° C. for 30 minutes to thus obtain a heterogeneous cation exchange membrane having a thickness of 0.70 mm, ion transport number of 0.89 and specific resistance of 103 Ω·cm.

EXAMPLE 17

90 parts of styrene monomer was mixed with 10 parts of divinylbenzene, subjected to emulsion copolymerization using potassium persulfate as a catalyst to obtain a finely powdered copolymer and then sulfonated with oleum, thus obtaining as a fine powder a strongly acidic cation exchange resin with an ion exchange capacity of 4.9 meq/g.

60 parts of the finely powdered cation exchange resin was mixed with 40 parts of polypropylene, blended by means of rolls and press-formed into a membrane-shaped article. The membrane-shaped article obtained in this way was immersed in a saturated aqueous solution of sodium chloride at 100° C. for 30 minutes to obtain a heterogeneous cation exchange membrane with a thickness of 0.8 mm, ion transport number of 0.89 and specific resistance of 112 Ω·cm.

EXAMPLE 18

71 parts of epichlorohydrin was reacted with 100 parts of pentaethylenehexamine, the resulting initial reaction product was mixed with 57 parts of Epicoat 828 (manufactured by Shell Chemical Co., WPE=180) and the mixture was adequately blended and cured or hardened, thus obtaining a moderately basic anion exchange resin ((C); ion exchange capacity=8.3 meq/g).

The anion exchange resin (C) was finely powdered to a grain size of 325 mesh or more by means of a vibrating mill. 60 parts of the finely powdered anion exchange resin was mixed with 40 parts of polypropylene, blended by means of rolls and press-formed into a membrane-shaped article (D).

The membrane-shaped article obtained in this way was immersed in a saturated aqueous solution of sodium chloride at 100° C. for 30 minutes to obtain a heterogeneous anion exchange membrane having a thickness of 0.85 mm, ion transport number of 0.91 and specific resistance of 125 Ω·cm.

COMPARATIVE EXAMPLE 8

The membrane-shaped article (D) obtained in an analogous manner to Example 18 was immersed in hot water at 100° C. for 30 minutes to obtain a heterogeneous anion exchange membrane having a thickness of 0.90 mm, ion transport number of 0.85 and specific resistance of 90 Ω·cm.

EXAMPLE 19

The moderately basic anion exchange resin (C) obtained in an analogous manner to Example 18 was finely powdered to a grain size of 325 mesh or more. 50 parts of the finely powdered anion exchange resin was mixed with 50 parts of polypropylene, blended by rolls and press-formed into a membrane-shaped article (E).

The resulting membrane-shaped article (E) was immersed in a saturated aqueous solution of sodium chloride at 100° C. for 30 minutes to obtain a heterogeneous anion exchange membrane having a thickness of 0.70 mm, ion transport number of 0.93 and specific resistance of 160 Ω·cm.

COMPARATIVE EXAMPLE 9

The membrane-shaped article (E) obtained in an analogous manner to Example 19 was immersed in hot water at 100° C. for 30 minutes to obtain an anion exchange membrane having a thickness of 0.78 mm, ion transport number of 0.86 and specific resistance of 140 Ω·cm.

EXAMPLE 20

Duolite A-57 (Epoxy-amine type anion exchange resin made by Diamond Jam Rock Chemical Co., Ion exchange capacity=7.8 meq/g) was finely powdered to a grain size of 325 mesh or more by means of a vibrating mill. 60 parts of the finely powdered anion exchange resin was mixed with 40 parts of polypropylene, blended by rolls and pressed to form a membrane-shaped article (F).

The resulting membrane-shaped article (F) was immersed in a saturated aqueous solution of sodium chloride at 100° C. for 30 minutes to obtain a heterogeneous anion exchange membrane having a thickness of 0.65 mm, ion transport number of 0.92 and specific resistance of 230 Ω·cm.

COMPARATIVE EXAMPLE 10

The membrane-shaped article (F) obtained in an analogous manner to Example 20 was immersed in hot water at 100° C. for 30 minutes to obtain a heterogeneous anion exchange membrane having a thickness of 0.70 mm, ion transport number of 0.87 and specific resistance of 170 Ω·cm.

EXAMPLE 21

92 parts of styrene monomer was mixed with 8 parts of divinylbenzene, subjected to suspension copolymerization using benzoyl peroxide as a catalyst to obtain a granular copolymer and then subjected to chloromethylation with chloromethyl methyl ether and further to amination with trimethylamine, thus obtaining a strongly basic anion exchange resin ((G); ion exchange capacity=1.3 meq/g.)

The resulting strongly basic anion exchange resin (G) was finely divided to a grain size of 325 mesh or more by means of a vibrating mill. 60 parts of this finely powdered anion exchange resin was mixed with 40 parts of high density polyethylene, kneaded by means of rolls and then pressed to form a membrane-shaped article (H).

The resulting membrane-shaped article (H) was immersed in a saturated aqueous solution of sodium chloride at 100° C. for 30 minutes to obtain a heterogeneous anion exchange membrane having a thickness of 0.70 mm, an ion transport number of 0.92 and a specific resistance of 125 Ω·cm.

COMPARATIVE EXAMPLE 11

The membrane-shaped article (H) obtained in an analogous manner to Example 21 was immersed in hot water at 100° C. for 30 minutes to obtain a heterogeneous anion exchange membrane having a thickness of 0.70 mm, ion transport number of 0.85 and specific resistance of 102 Ω·cm.

EXAMPLE 22

The moderately basic anion exchange resin (C) obtained in an analogous manner to Example 18 was finely powdered to a grain size of 325 mesh or more by means of a vibrating mill. 60 parts of this finely powdered anion exchange resin was mixed with 40 parts of polypropylene, blended adequately by means of rolls and formed into a sheet, thus obtaining a membrane-shaped article (I).

The resulting membrane-shaped article (I) was immersed in a saturated aqueous solution of sodium chloride at 100° C. for 30 minutes to obtain a heterogeneous anion exchange membrane having a thickness of 0.40 mm, ion transport number of 0.94 and specific resistance of 190 Ω·cm.

COMPARATIVE EXAMPLE 12

The membrane-shaped article (I) obtained in an analogous manner to Example 22 was immersed in hot water at 100° C. for 30 minutes to obtain a heterogeneous anion exchange membrane having a thickness of 0.40 mm, an ion transport number of 0.84 and a specific resistance of 160 Ω·cm.

EXAMPLES 26 TO 28 AND COMPARATIVE EXAMPLE 14

The membrane-shaped articles (I) obtained in an analogous manner to Example 22 were immersed in aqueous solutions of sodium chloride having various concentrations as shown in Table 5 at 100° C. for 30 minutes. The thickness, ion transport number and specific resistance of the resulting heterogeneous anion exchange membranes are shown in Table 5.

Table 5

|  | Ex. 26 | Ex. 27 | Ex. 28 | Ex. 22 | Comparative Ex. 1 |
|---|---|---|---|---|---|
| Concentration of Aqueous Sodium Chloride Solution (% by weight) | 5 | 10 | 20 | 29 (Saturated) | 3 |
| Thickness (mm) | 0.40 | 0.40 | 0.40 | 0.40 | 0.40 |
| Ion Transport Number | 0.89 | 0.91 | 0.92 | 0.94 | 0.82 |
| Specific Resistance (Ω·cm) | 132 | 160 | 175 | 190 | 105 |

EXAMPLES 29 TO 33

The membrane-shaped articles (I) obtained in an analogous manner to Example 22 were immersed in 23 weight % aqueous solutions of alkali metal compounds or ammonium compounds as shown in Table 6 at 100° C. for 30 minutes. The thickness, ion transport number and specific resistance of the resulting heterogeneous anion exchange membranes are tabulated in Table 6.

Table 6

|  | Examle 29 | Example 30 | Example 31 | Example 32 | Example 33 |
|---|---|---|---|---|---|
| Alkali Metal Compounds and Ammonium Compound | Sodium Carbonate | Sodium Sulfate | Sodium Acetate | Potassium Chloride | Ammonium Sulfate |
| Thickness (mm) | 0.40 | 0.40 | 0.40 | 0.40 | 0.40 |
| Ion Transport Number | 0.94 | 0.91 | 0.91 | 0.91 | 0.93 |
| Specific Resistance (Ω·cm) | 359 | 258 | 192 | 175 | 187 |

EXAMPLES 23 TO 25 AND COMPARATIVE EXAMPLE 13

The membrane-shaped articles (I) obtained in an analogous manner to Example 22 were immersed in a saturated aqueous solution of sodium chloride at various temperatures as shown in Table 4. The membrane thickness, ion transport number and specific resistance of the resulting heterogeneous anion exchange membranes are shown in Table 4.

Table 4

|  | Ex. 23 | Ex. 24 | Ex. 22 | Ex. 25 | Comparative Ex. 13 |
|---|---|---|---|---|---|
| Treating Temperature (°C.) | 80 | 90 | 100 | 105 | 70 |
| Thickness (mm) | 0.40 | 0.40 | 0.40 | 0.40 | 0.40 |
| Ion Transport Number | 0.95 | 0.92 | 0.94 | 0.93 | 0.90 |
| Specific Resistance (Ω·cm) | 240 | 200 | 190 | 180 | 280 |

The ion exchange capacity, ion transport number and specific resistance used in the above described examples are measured as follows:

(1) Ion Exchange Capacity: In the case of a cation exchange resin, 1 g of a dry cation exchange resin or heterogeneous cation exchange membrane is treated with hydrochloric acid to convert the cation exchange groups completely into H-form, subjected to ion exchange reaction with an aqueous solution of sodium chloride and the quantity of $Na^+$ exchanged for H is represented by milliequivalent.

(2) Ion Transport Number: Calculated by separating a 0.5 N aqueous solution of sodium chloride and 0.005 N aqueous solution of sodium chloride through a membrane and measuring the membrane potential between both the aqueous solutions.

(3) Specific Resistance: Electric resistance (Ω·cm) of a membrane when an alternating current (frequency 1000 Hz) is passed through a 0.5 N aqueous solution of sodium chloride.

What is claimed is:

1. A process for preparing a heterogeneous ion exchange membrane having a high ion transport number in the presence of a high ion concentration, which comprises mixing 2-8 parts by weight of a finely powdered ion exchange resin with 2-8 parts by weight of a crystalline polyolefin resin, forming the resultant mixture into a membrane-shaped article and treating the membrane-shaped article with an aqueous solution of a salt component which is at least one member selected from the group consisting of alkali metal salts and ammonium salts, at a temperature of at least 80° C. for at least 10 minutes, the concentration of said salt component in the aqueous solution being from 17% by weight to saturation.

2. The process as claimed in claim 1, wherein 4-7 parts by weight of the polyolefin resin are mixed with 3-6 parts by weight of the ion exchange resin.

3. The process as claimed in claim 1, wherein the alkali metals are selected from the group consisting of lithium, sodium, potassium, rubidium and cesium.

4. The process as claimed in claim 1, wherein the alkali metal salts are selected from the group consisting of sodium chloride, sodium carbonate, sodium sulfate, sodium acetate and potassium chloride.

5. The process as claimed in claim 1, wherein the salts are selected from the group consisting of alkali metal chlorides, alkali metal sulfates, alkali metal nitrates, alkali metal phosphates, alkali metal acetates, ammonium chloride, ammonium sulfate, ammonium nitrate, ammonium phosphate and ammonium acetate.

6. The process as claimed in claim 1, wherein the concentration of said salt component in the aqueous solution is from 23% by weight to saturation.

7. The process as claimed in claim 1, wherein the aqueous solution is a saturated aqueous solution of said salt component.

8. The process as claimed in claim 1, wherein the crystalline polyolefin resin is selected from the group consisting of polyethylene, polypropylene and polybutene resins.

9. The process as claimed in claim 1, wherein the crystalline polyolefin resin is selected from the group consisting of resins of ethylene-containing copolymers and propylene-containing copolymers.

10. The process as claimed in claim 1, wherein treatment with the aqueous solution is carried out for 20 minutes to several hours.

11. The process as claimed in claim 2, wherein the aqueous solution is an aqueous solution of at least one salt selected from the group consisting of sodium chloride, sodium sulfate, potassium chloride, potassium sulfate, ammonium chloride and ammonium sulfate.

* * * * *